Patented Aug. 16, 1938

2,127,400

UNITED STATES PATENT OFFICE 2,127,400

PLASTICIZERS

Carlin F. Gibbs, Cuyahoga Falls, Ohio, assignor to The B. F. Goodrich Company, New York, N. Y., a corporation of New York No Drawing. Application June 25, 1937, Serial No. 150,327

15 Claims. (Cl. 106—22)

This invention relates to plasticizers and to plastic compositions containing them, and has as its principal object to provide a new class of plasticizers which impart desirable properties to compositions in which they are used.

Many of the recently developed synthetic plastic materials are organic resins which require plasticizers to render them less brittle and more easily workable. Plasticizers are also used in lacquers and paints containing plastics to impart the desired flexibility to films formed therefrom. Among the synthetic organic materials with which plasticizers are frequently used are included chlorinated rubber, urea-aldehyde resins, phenol-aldehyde resins, cellulose esters and ethers, polystyrenes, and resins obtained by polymerizing vinyl or acrylic esters. While the plasticizers of this invention may be used incorporated with organic resins in general, they are particularly useful in the polyvinyl halide compositions described in U. S. Patent No. 1,929,453 issued to Waldo L. Semon.

I have discovered that organic sulfones as a class are excellent plasticizers. All of the compounds included within the scope of this invention have the structural formula

where $R_1$ and $R_2$ represent hydrocarbon or substituted hydrocarbon groups. Besides carbon and hydrogen, $R_1$ and $R_2$ may contain halogen, oxygen, and sulfone groups, but no others. Thus R may be selected from a large class of radicals including methyl, ethyl, isopropyl, amyl, cyclohexyl, phenyl, ortho, meta, or para tolyl, xylyl, xenyl, alpha or beta naphthyl, benzyl, phenylethyl, naphthylmethyl, tetrahydronaphthyl, octahydronaphthyl, methoxymethyl, methoxyethyl, acetonyl, propionylmethyl, carbethoxymethyl, ethylsulfonylethyl, anisyl, phenethyl, phenylsulfonylmethyl, phenylsulfonylacetylmethyl, chloromethyl, chlorophenyl, chloronaphthyl and many other similar groups.

It is possible in some cases to use solid materials as plasticizers. Compositions containing them are apt to be stiff and boardy, however, and in general do not have the desirable properties obtainable when liquid plasticizers are used. The sulfones wherein $R_1$ and $R_2$ are identical are usually solids when pure, but many of them may be liquefied by mixing them with isomeric or similar compounds to lower the melting point sufficiently to form a liquid material. Hydrogenation of ring structures, substituting halogen for hydrogen and adding an alkoxy group usually tend to convert solid materials into more useful liquid plasticizers.

The preferred compounds are those sulfones in which $R_1$ contains an aromatic group and in which $R_2$ is aliphatic. Ethyl beta-naphthyl sulfone, 2-methoxyethyl beta-naphthyl sulfone, propionylmethyl p-tolyl sulfone, carbethoxymethyl p-tolyl sulfone, and 2-methoxyethyl beta-naphthylmethyl sulfone are all materials which are very useful plasticizers.

The sulfones are easily prepared by well-known methods, the most convenient being by the oxidation of the proper sulfide. To prepare ethyl beta-naphthyl sulfone, for instance, beta-thionaphthol is reacted with ethyl chloride in the presence of sodium hydroxide to produce ethyl beta-naphthyl sulfide which may then be oxidized with hydrogen peroxide to ethyl beta-naphthyl sulfone.

The plasticizers may be combined with the organic resins by any of the ordinary methods. In the preparation of phenol-aldehyde resins, for instance, the plasticizer is usually included in the composition before resinification occurs. Similarly, polyvinyl halides may be polymerized in the presence of plasticizers to form plasticized compositions of the soluble polymers. It is usually desirable, however, to add the plasticizer to the insoluble (gamma) polymer after polymerization. The plasticizer may be mixed with the powdered polyvinyl chloride and the mixture may be homogenized on a heated roll mill or in a heated internal mixer. If desired, the polyvinyl chloride may be dissolved in the plasticizer or a mixture thereof with a volatile solvent at elevated temperatures, usually from 100°–150° C.

To illustrate the desirable properties imparted to compositions by the plasticizers of this invention, equal parts of gamma polyvinyl chloride and 2-methoxyethyl-beta-naphthyl sulfone were homogenized on a heated roll mill. When this composition was molded in a press, a composition having unusually high tensile strength and elongation was obtained. The heat loss when the composition was heated in a hot air oven at 100° C. was much lower than the loss from compositions containing almost any of the usual plasticizers.

The resistance of polyvinyl halide compositions to petroleum solvents is well-known. Nevertheless, it has been found that compositions containing ordinary plasticizers eventually become stiffer when used in gasoline and oils due to the extraction of plasticizers by the petroleum solvents.

Compositions containing the plasticizers of this invention, however, are unusually resistant to petroleum solvents. Polyvinyl halide compositions plasticized with 2-methoxyethyl beta-naphthyl sulfone, for instance, are stiffened by gasoline only from one-half to one-third as fast as those plasticized with tricresyl phosphate, and only one tenth as fast as those plasticized with dibutyl phthalate.

It is to be understood that carbon black, clay, barytes, zinc oxide, wood flour, and other pigments and fillers commonly used in the rubber and plastics industries may be included in the organic resinous compositions.

The plasticizers of this invention may also be used in conjunction with other types of plasticizers, although this is generally undesirable because the commercially available plasticizers are inferior and prevent the full advantages of these new plasticizers from being attained.

Although I have herein disclosed specific embodiments of my invention, I do not limit myself wholly thereto, for any modifications such as the substitution of equivalent materials and the variation of proportions used are within the spirit and scope of the invention as defined in the appended claims.

I claim:

1. The method which comprises plasticizing a polyvinyl halide with an organic sulfone.
2. The method which comprises plasticizing a polyvinyl halide with a sulfone containing no other elements than carbon, hydrogen, oxygen, sulfur and a halogen.
3. The method which comprises plasticizing a polyvinyl halide with an aliphatic aromatic sulfone.
4. The method which comprises plasticizing a polyvinyl halide with an alkyl aryl sulfone.
5. The method which comprises plasticizing a polyvinyl halide with an alkoxyalkyl-aryl sulfone.
6. The method which comprises plasticizing gamma polyvinyl chloride with 2-methoxyethyl beta-naphthyl sulfone.
7. The method which comprises plasticizing gamma polyvinyl chloride with ethyl beta-naphthyl sulfone.
8. The method which comprises plasticizing gamma polyvinyl chloride with 2-methoxyethyl beta-naphthylmethyl sulfone.
9. A plasticized composition comprising a polyvinyl halide and an organic sulfone.
10. A plasticized composition comprising a polyvinyl halide and a sulfone containing no other elements than carbon, hydrogen, oxygen, sulfur, and a halogen.
11. A plasticized composition comprising a polyvinyl halide and an aliphatic aralkyl sulfone.
12. A plasticized composition comprising a polyvinyl halide and an alkoxyalkyl aralkyl sulfone.
13. A plasticized composition comprising gamma polyvinyl chloride and 2-methoxyethyl beta-naphthyl sulfone.
14. A plasticized composition comprising gamma polyvinyl chloride and ethyl beta-naphthyl sulfone.
15. A plasticized composition comprising gamma polyvinyl chloride and methoxyethyl beta-naphthylmethyl sulfone.

CARLIN F. GIBBS.